(12) United States Patent
Booth et al.

(10) Patent No.: US 6,324,325 B1
(45) Date of Patent: Nov. 27, 2001

(54) THEREOF FIBER INTERCONNECTION APPARATUS AND PROCESS FOR THE PREPARATION

(76) Inventors: Bruce L. Booth, 1669 Warpath Rd., West Chester, PA (US) 19382; Robert J. Furmanak, 198 Brandywine Blvd., Wilmington, DE (US) 19809; Danahey Ryan, 528 Rock Run Rd., Port Deposit, MD (US) 21904

(*) Notice: Subject to any disclaimer, the term of this patent is extended or adjusted under 35 U.S.C. 154(b) by 0 days.

(21) Appl. No.: 09/498,111

(22) Filed: Feb. 4, 2000

(51) Int. Cl.[7] .................................................. G02B 6/44

(52) U.S. Cl. ............................................................. 385/114

(58) Field of Search ............................ 385/100–114, 147

(56) References Cited

U.S. PATENT DOCUMENTS

| | | | | |
|---|---|---|---|---|
| 5,312,545 | * | 5/1994 | Kuo et al. | 385/129 |
| 5,830,306 | * | 11/1998 | Hinson | 156/248 |
| 6,007,413 | * | 12/1999 | Fitz | 451/312 |
| 6,093,275 | * | 7/2000 | Hinson | 156/248 |
| 6,171,177 | * | 1/2001 | Fitz | 451/59 |
| 6,181,856 | * | 1/2001 | Brun | 385/52 |

* cited by examiner

*Primary Examiner*—Akm E. Ullah

(57) ABSTRACT

An improved, lower cost, optical fiber interconnect device of the type known as a "perfect shuffle" and processes for the preparation thereof. The present invention relates to devices that are smaller in size than prior art devices and that exhibit superior optical properties including lower attenuation loss (lower insertion loss) and to processes which produce such devices.

21 Claims, 17 Drawing Sheets

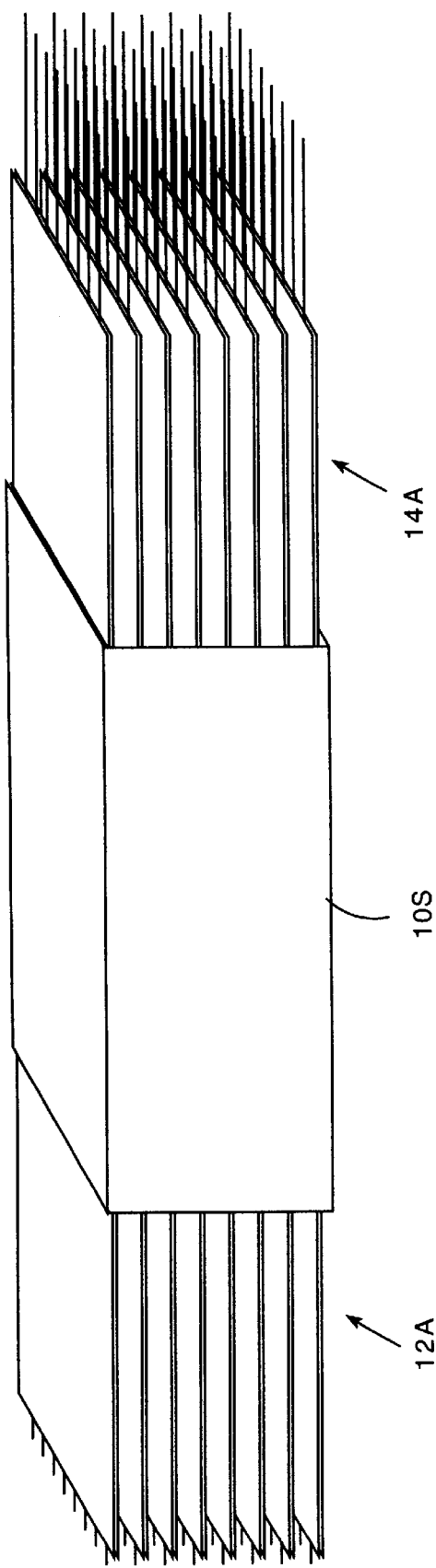

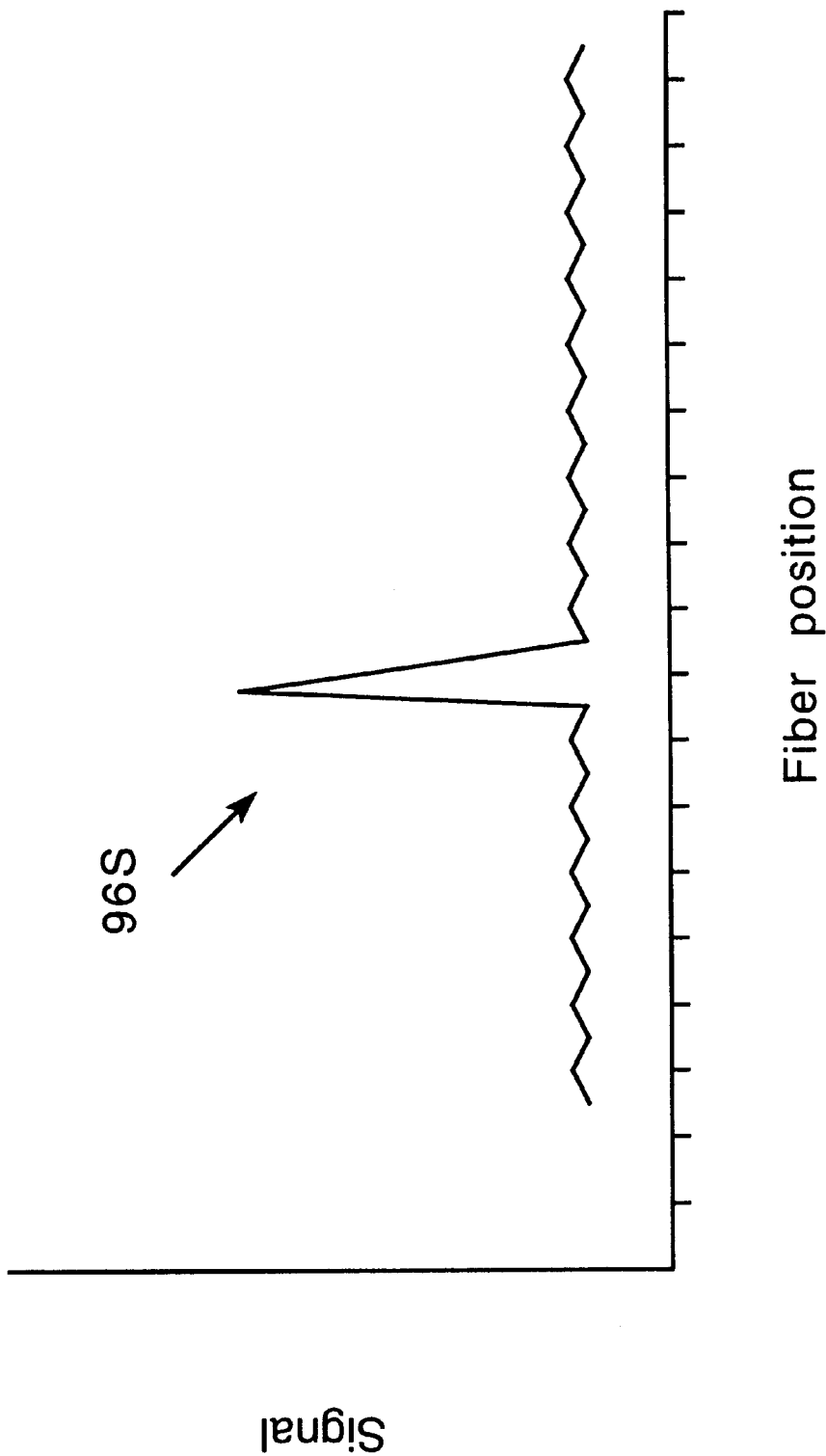

THEREOF FIBER INTERCONNECTION APPARATUS AND PROCESS FOR THE PREPARATION

FIELD OF THE INVENTION

The present invention relates to optical fiber interconnect devices of the type known as a "perfect shuffle" and to processes for preparing such interconnect devices. More particularly, the present invention relates to devices smaller in size than prior art devices and to devices that exhibit superior optical properties including lower attenuation loss (lower insertion loss) and to fabrication processes which produce such devices.

BACKGROUND OF THE INVENTION

In applications for the transmission of information via laser light energy through optical fibers, the optical fibers are typically arranged into groups and these groups are assembled as ribbons that contain multiple optical fibers. The groups may be arranged into supergroups by stacking multiple optical fiber ribbons to form an array structure. Such an array is typically comprised of rows and columns of fibers, each row comprising all the fibers contained within a particular ribbon and each column comprising one particular fiber from each ribbon. When it is necessary to distribute information from one optical fiber in a row group to an optical fiber in a column group an interconnect device known in the art as a "perfect shuffle" is typically used. Since interconnection devices typically introduce loss when inserted into a fiber optic transmission system, it is desirable that losses within the device be as low as possible. Single mode optical fiber systems are desirable when large amounts of information need to be transmitted but are particularly sensitive to transmission losses related to precise alignment of fibers. Prior art devices typically create a physical connection within the device, such as a splice or other optical junction, between an incoming fiber and an outgoing fiber and this physical connection creates an optical loss within the interconnection device.

Thus a need exists for an optical fiber perfect shuffle interconnection device that can be easily manufactured and which achieves lower optical losses than prior art devices.

The present invention overcomes many of the limitations of the prior art and provides some additional benefits at reduced cost of manufacture.

SUMMARY OF THE INVENTION

There is disclosed and claimed herein an optical fiber interconnect apparatus of the type known as a "perfect shuffle" and methods of making this optical fiber interconnect apparatus, useful for connecting two M by N arrays of optical fibers, each array comprising M rows and N columns or N rows and M columns of fibers, wherein each row is identified by a first subscript i and each column is identified by a second subscript j, wherein a fiber at a input position ij of the input array is routed to a corresponding fiber at an output position ji of the output array, the method comprising: (a) assembling a first input array of optical fibers, comprising M optical fiber ribbons, where each ribbon comprises a row-group of fibers and (b) assembling a second output array of optical fibers, comprising N optical fiber ribbons, where each ribbon comprises a column-group of fibers so that a fiber at a position ij of the input array is routed to a corresponding fiber at a position ji of the output array.

The first input array of optical fibers is assembled by assembling a first group of ribbons each comprising a row-group of fibers. In a first ribbon assembly method, each ribbon is assembled by laying down a plurality of N optical fibers onto a first adhesive-coated carrier tape. The tape has a predetermined width, a first and second end and a centerline. Each fiber has a first end corresponding to the input array and a second end corresponding to the output array. A first portion of each fiber is placed on the adhesive-coated surface of the tape parallel to the centerline. The first fiber portion is chosen to be adjacent the first end of each fiber, with the first end of each fiber extending substantially beyond the first end of the carrier tape and the second end of each fiber extending substantially beyond the second end of the carrier tape. After the fibers are laid down on the first tape a second adhesive-coated carrier tape is positioned atop the first tape with the adhesive coated surface facing the adhesive coated surface of the first tape so that the first fiber portions are sandwiched between the first and second tapes to form the first optical fiber ribbon. The ribbon assembling step is then repeated until M ribbons are assembled. The M ribbons are stacked atop one another to form the first input array of fibers.

The second output array of optical fibers is created by assembling a second group of ribbons, each comprising a column-group of fibers. A first ribbon of the second group is assembled by selecting a first optical fiber from each row-group (i.e., each ribbon) of the first array. A second portion of each selected fiber is laid down onto a third adhesive-coated carrier tape. This second fiber portion is chosen to be adjacent the second end of each fiber, with the second end of each fiber extending substantially beyond the second end of the carrier tape.

The third adhesive-coated carrier tape has first and second ends and a centerline. The first end of the third tape is adjacent to the second end of the first and second tapes. Each fiber is placed on the adhesive-coated surface of the tape parallel to the centerline with the second end of each fiber extending substantially beyond the second end of the third carrier tape. A fourth adhesive-coated carrier tape is then positioned atop the third tape so that the selected fibers are sandwiched between the third and fourth tapes to form a first column-group optical fiber ribbon.

A second ribbon of the second group is assembled by selecting a second optical fiber from each row-group (i.e., each ribbon) of the first array and sandwiching these second optical fibers between third and fourth tapes to form a second column-group optical fiber ribbon. Successive ribbons of the second group are assembled by selecting successive optical fibers from each row-group (i.e., each ribbon) of the first array until N ribbons are assembled. The N ribbons are then stacked atop one another to form the second output array of fibers.

In a second assembly method the ribbons are formed by positioning the fibers in a side-by-side arrangement and coating them with a liquid adhesive that is then cured to form the ribbons.

Thus a fiber at input position ij of the input array is routed to a corresponding output position ji of the output array, without any splices or optical junctions within the device.

DETAILED DESCRIPTION OF THE DRAWINGS

FIG. 11 shows an assembled device with a support sleeve over at least part of the first ribbons and at least part of the second ribbons;

FIG. 15A shows a typical signal created by the photodetector imaging a ribbon within an array.

DESCRIPTION OF THE INVENTION

Figure 8:
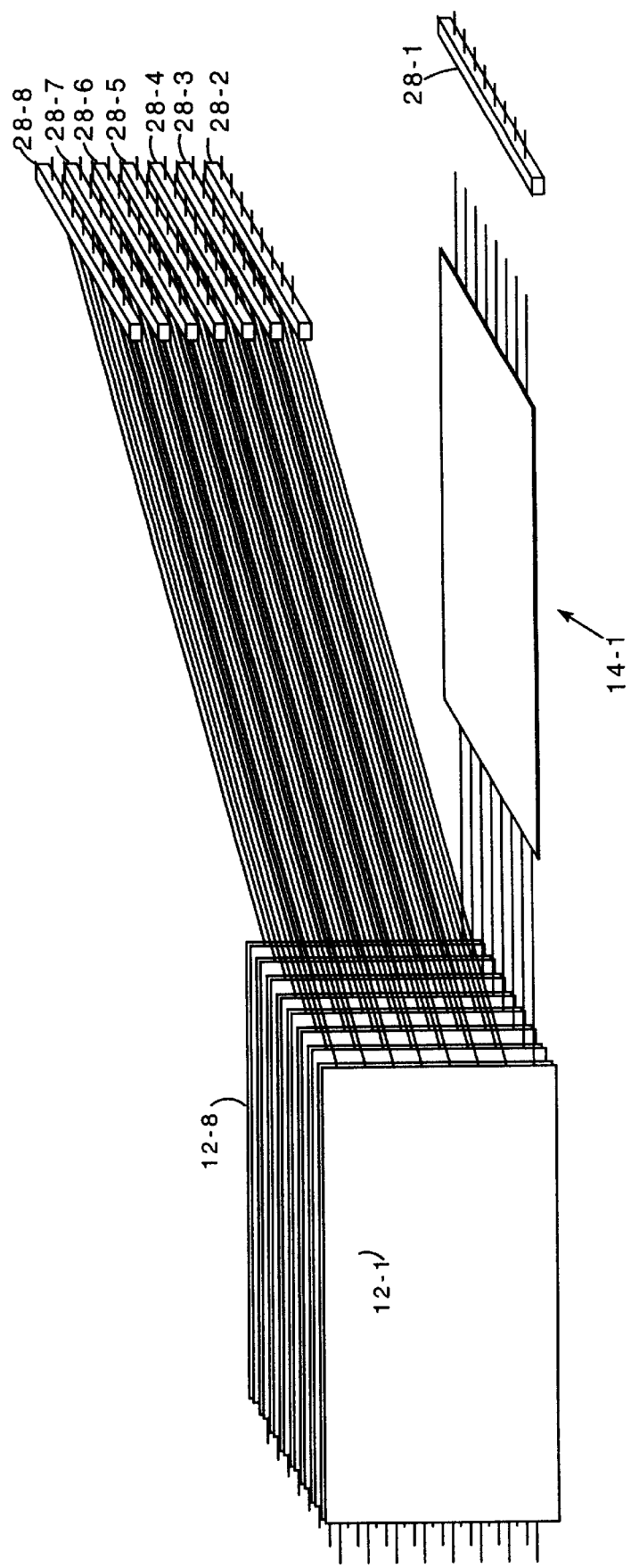
FIG. 8 is a perspective view of a third step for assembling the first ribbon of the second group.
Figure 9:
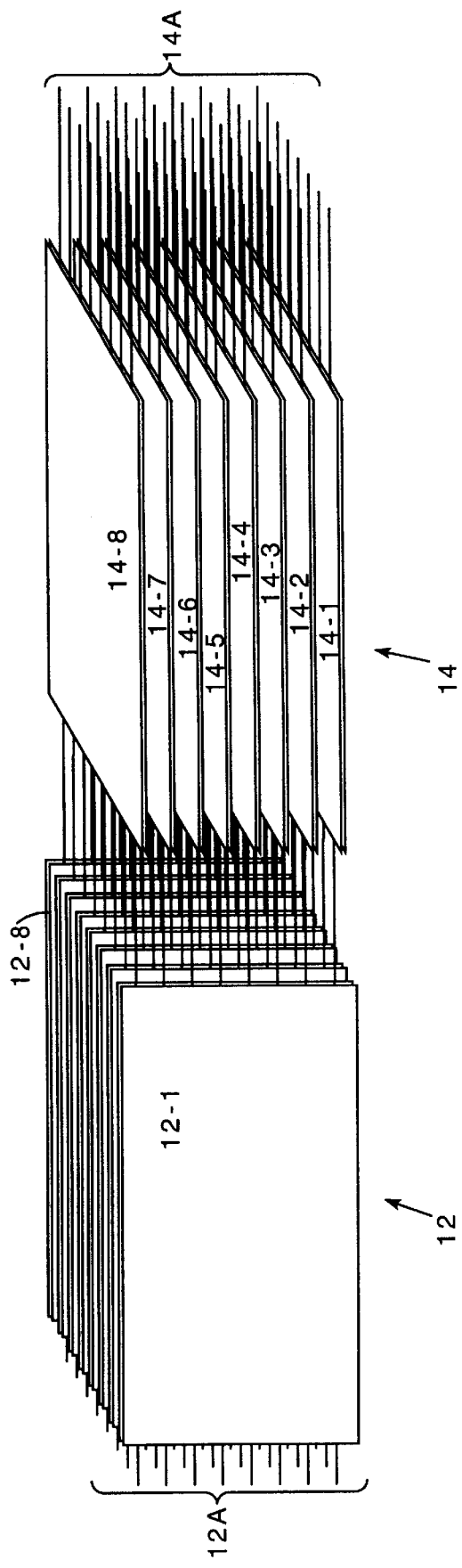
FIG. 9 is a perspective view showing the assembled device.
Figure 10:
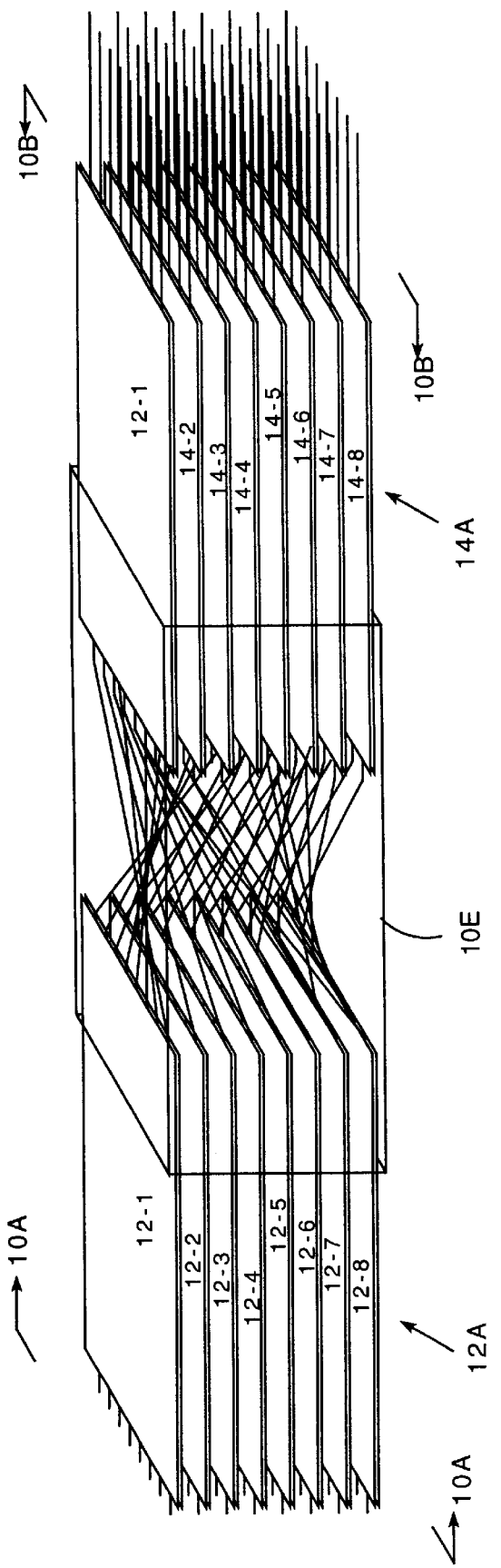
FIG. 10 shows an optional step of twisting the second groups ribbons into alignment with the first group of ribbons.
Figure 12:
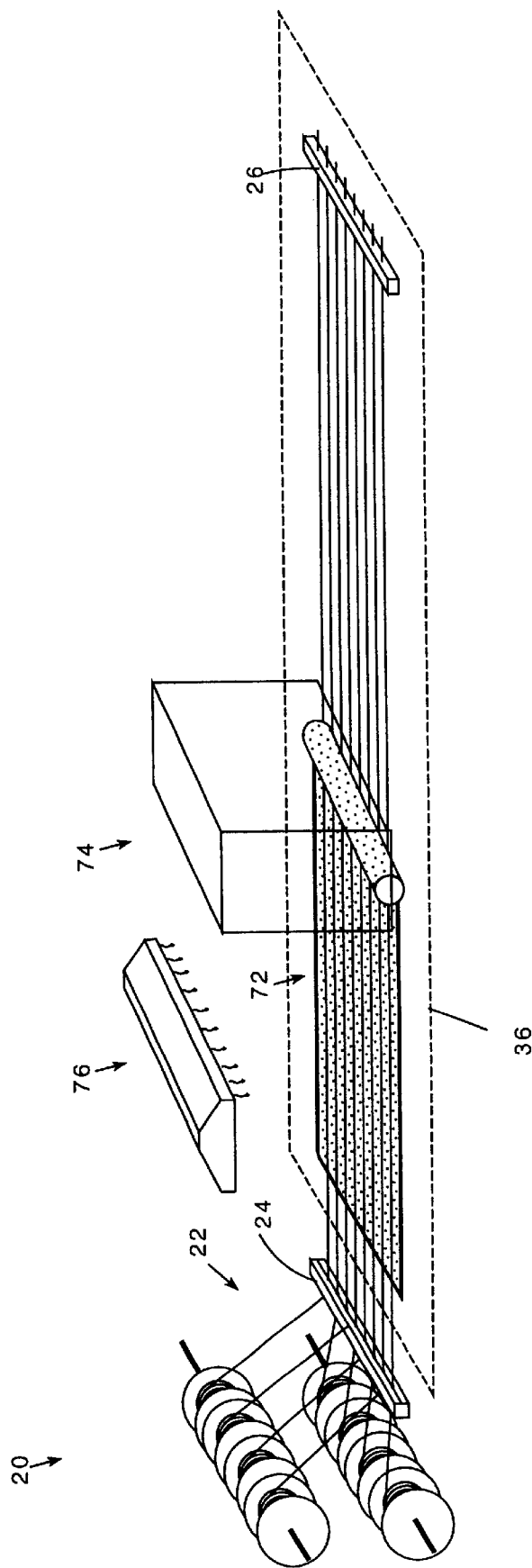
FIG. 12 shows a second assembly method wherein a liquid adhesive is used to form the ribbons.
Figure 13:
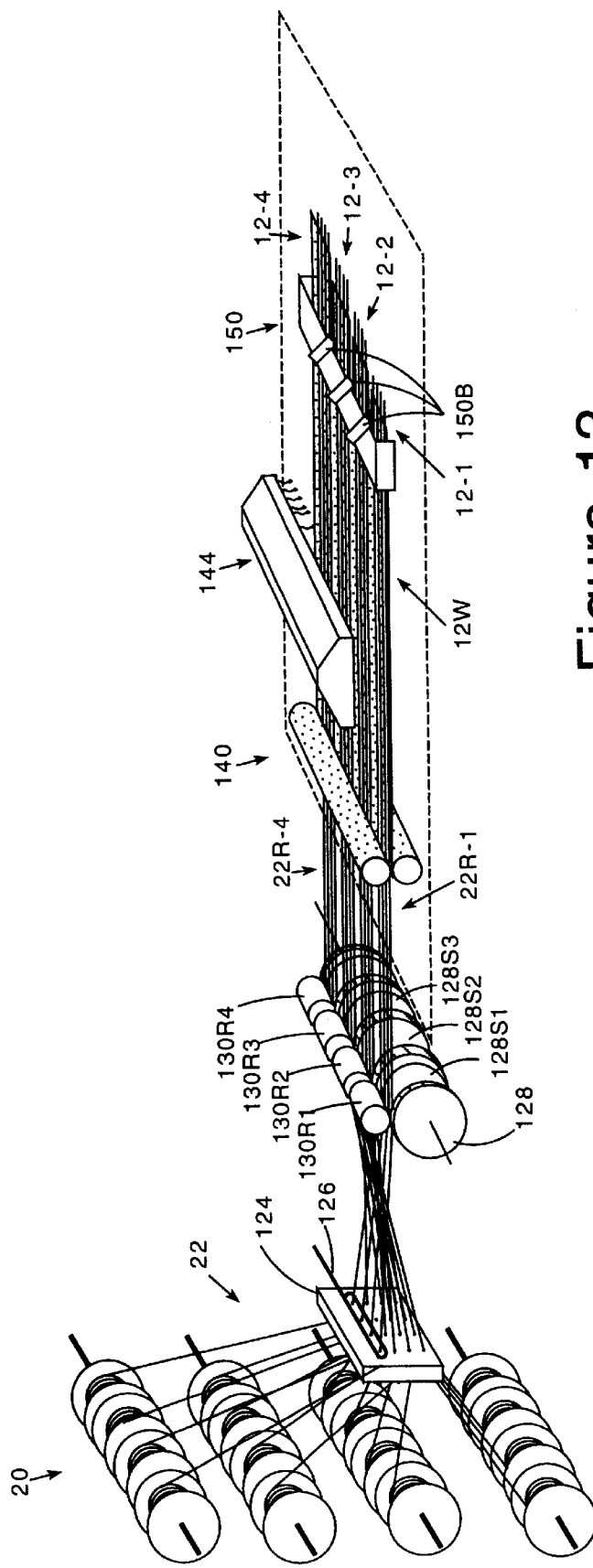
FIG. 13 shows a first step of a third assembly method, wherein the ribbons of a first array are formed simultaneously.
Figure 14:
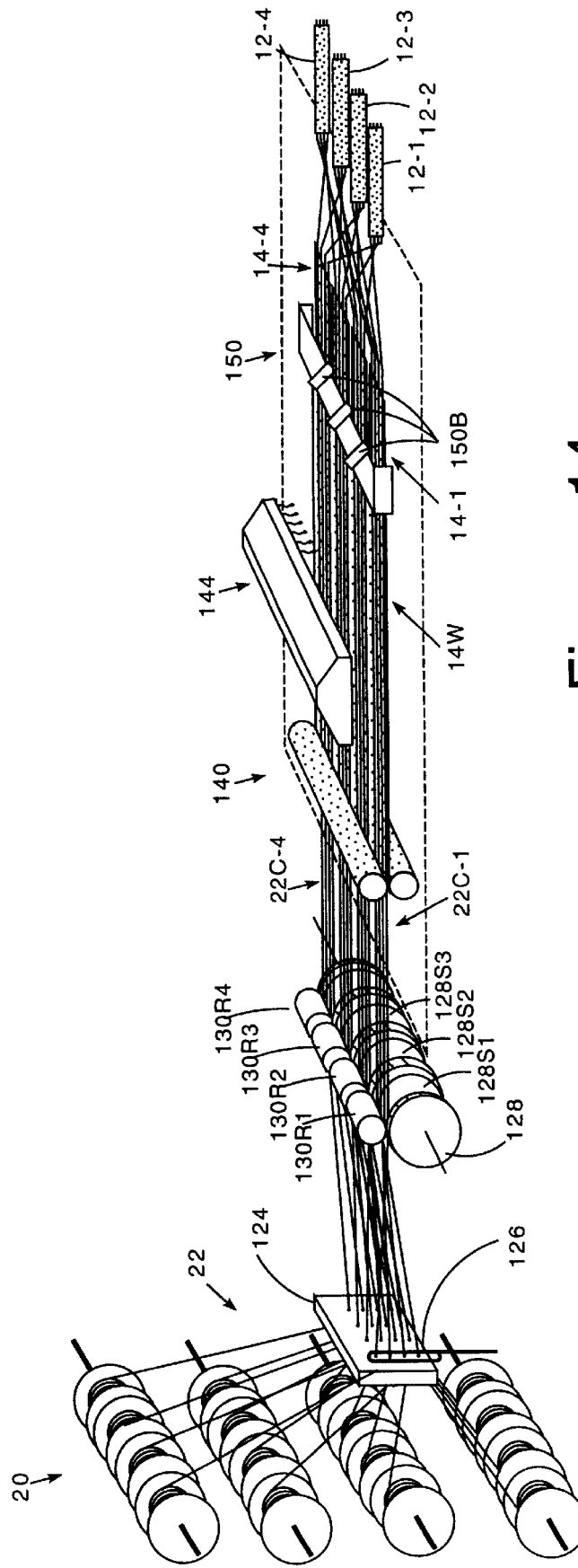
FIG. 14 shows a second step of a third assembly method, wherein the ribbons of a second array are formed simultaneously.
Figure 15:
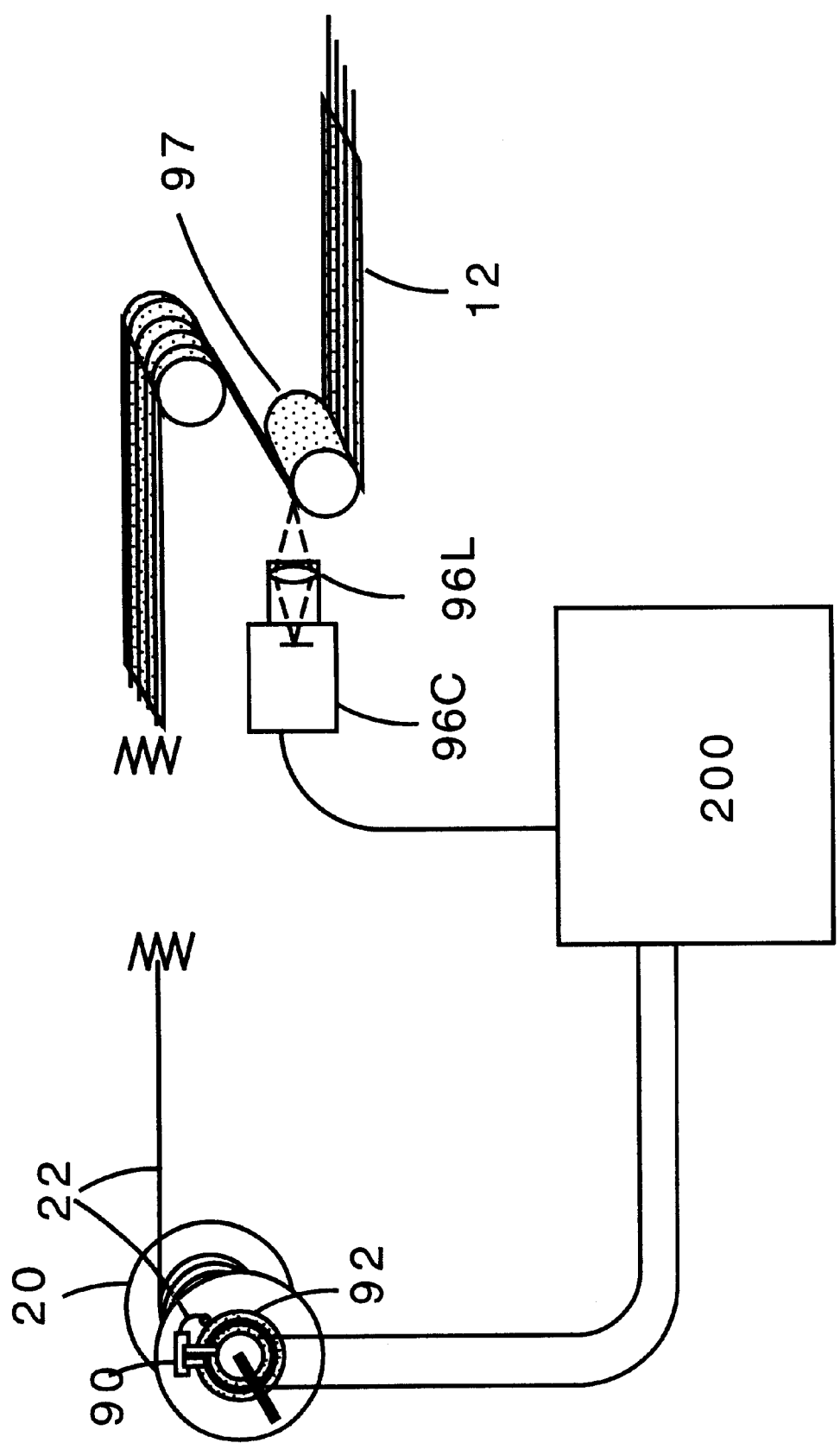
FIG. 15 shows a quality control method to verify the position of a fiber within an array.

The following description provides detail particular to a first assembly method depicted in FIGS. 1–9, a resulting apparatus in FIGS. 10–11, a second assembly method depicted in FIG. 12, a third assembly method depicted in FIGS. 13–14, and a quality control method depicted in FIGS. 15–15A. It is to be appreciated that the invention encompasses other assembly methods. For clarity of illustration an 8 by 8 fiber array is depicted in FIGS. 1–12 and a 4 by 4 array is depicted in FIGS. 13 and 14. It should be appreciated that larger arrays, such as a 12 by 12 array, a 16 by 32 array, or even larger arrays, would typically be assembled for use in commercial optical fiber telecommunication systems.

Figure 1:
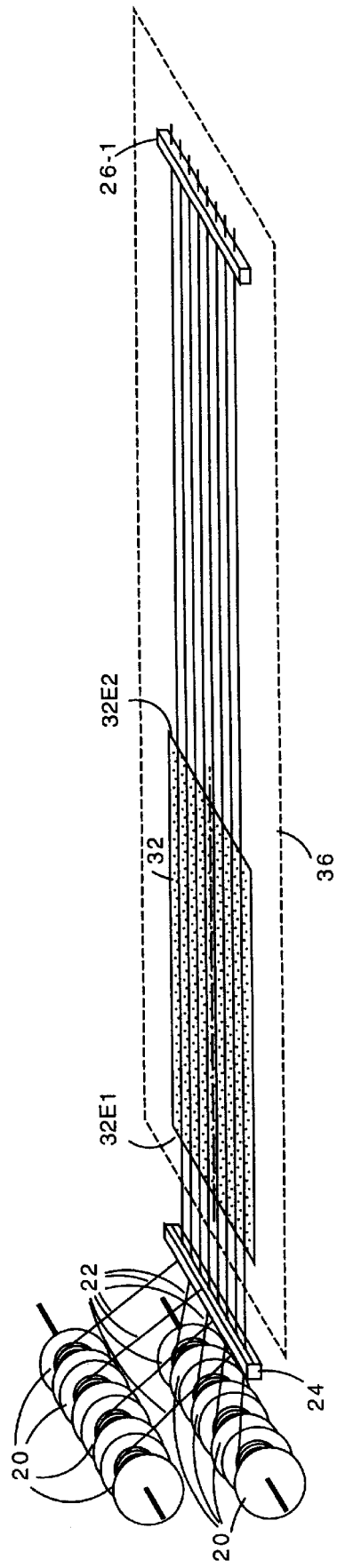
FIG. 1 is a perspective view of a first step for assembling a first ribbon of a first group.

Referring to FIG. 1, a series of eight spools 20 of commercial glass optical fiber, such as a single-mode fiber known as "SMF 28" available from Corning Glass Works, are provided. Each of the eight fibers 22 is threaded through a guide 24 and the end of each fiber is secured in a clamp 26-1. A first adhesive-coated tape 32, such as a transparent polyester tape, is secured to an assembly surface 36 at a suitable distance from the guide 24. The tape 32 has a first end 32E1 and a second end 32E2 and a centerline 32C.

Figure 2:
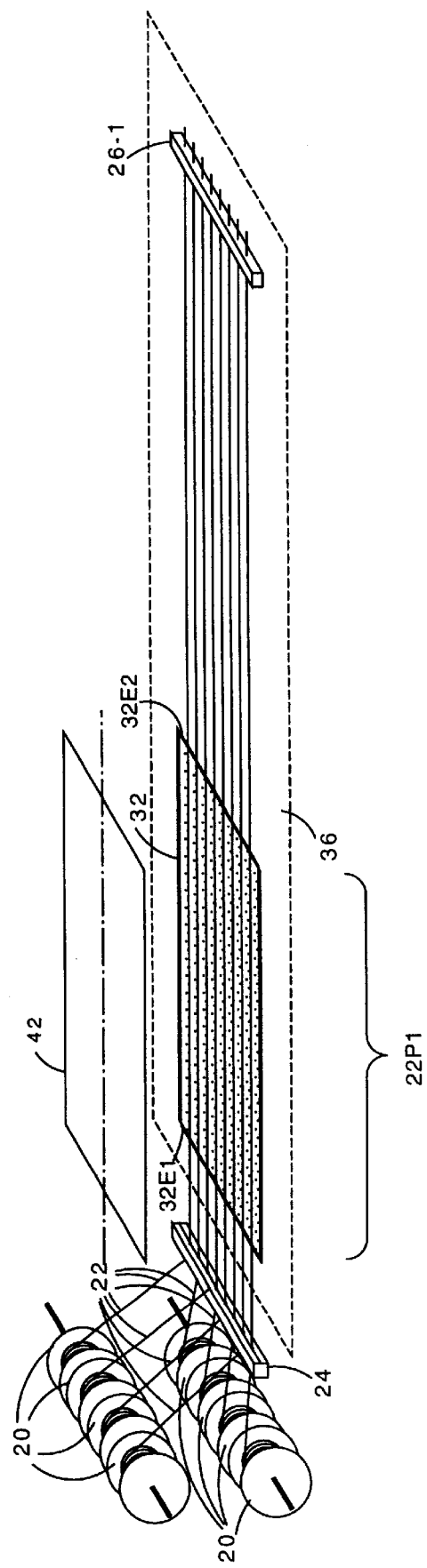
FIG. 2 is a perspective view of a second step for assembling the first ribbon.

As seen in FIG. 2 the fibers 22 are drawn through the guide 24 until a suitable length is unwound. The clamp 26-1 is then positioned so that a suitable length of fiber extends beyond the second end 32E2 of the first tape 32. A first portion 22P1 of each fiber 22 lying above the tape 32 is pressed down, adhering the fibers to the tape 32 in a side by side arrangement.

Figure 3:
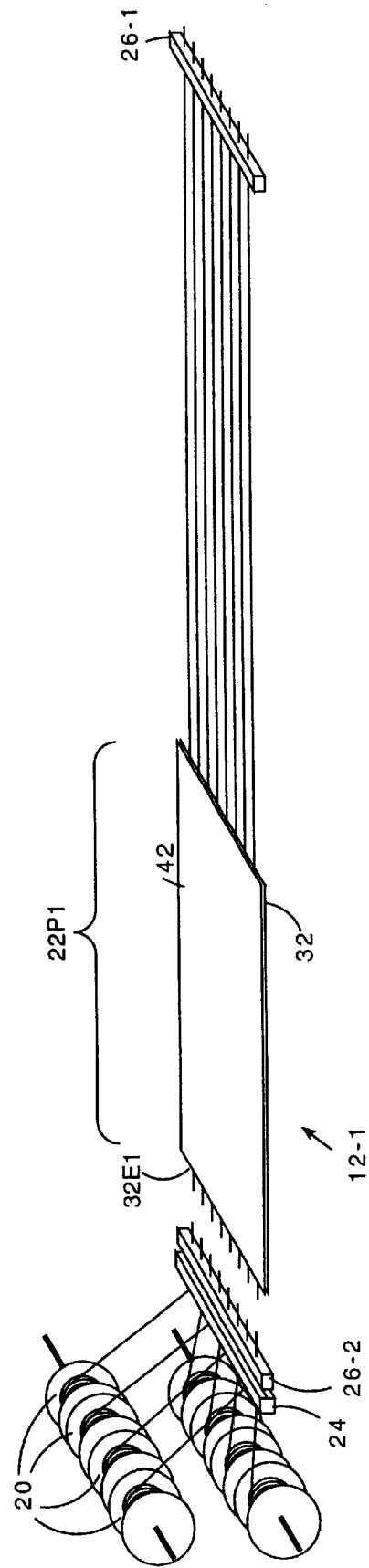
FIG. 3 is a perspective view of a third step for assembling the first ribbon.

As seen in FIG. 3 a second clamp 26-2 is secured to the fibers adjacent to the guide 24. The fibers 22 are then cut off just beyond clamp 26-2 so that suitable length of fiber 22 extends beyond the first end 32E1 of the first tape 32. A second tape 42 is then applied atop the fibers 22 and tape 32, sandwiching the portion 22P1 of the fibers 22 between tapes 32 and 42 to form a first row-group ribbon 12-1.

Figure 4:
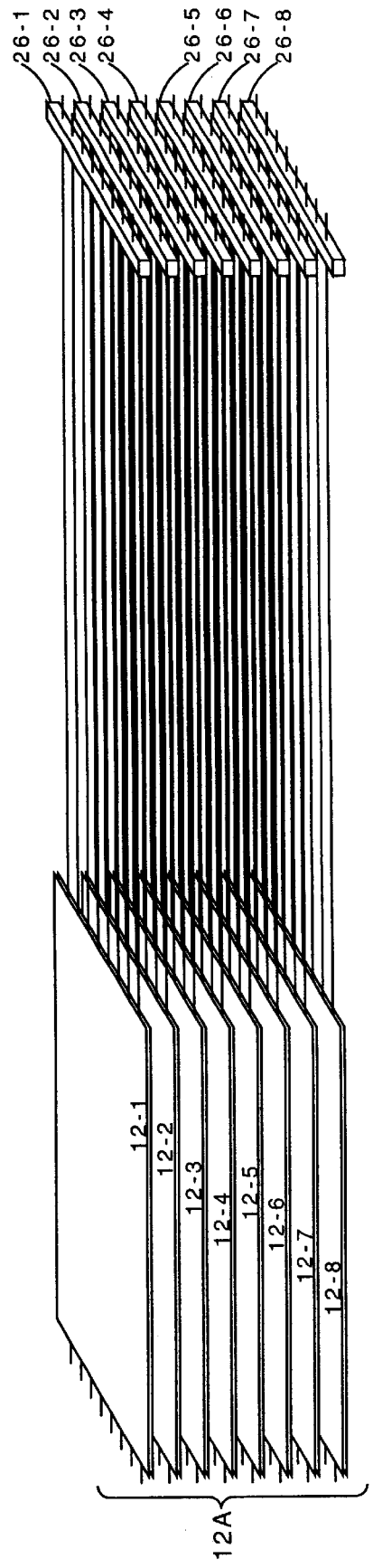
FIG. 4 is a perspective view of an arrangement for stacking the first group of ribbons.

The steps of FIGS. 1–3 are then repeated until eight ribbons 12-1 through 12-8 have been formed. As seen in FIG. 4 the eight ribbons are stacked and secured together to form an input array 12A of fibers. Clamps 26-1 through 26-8 secure the fiber ends of ribbons 12-1 through 12-8 respectively.

Figure 5:
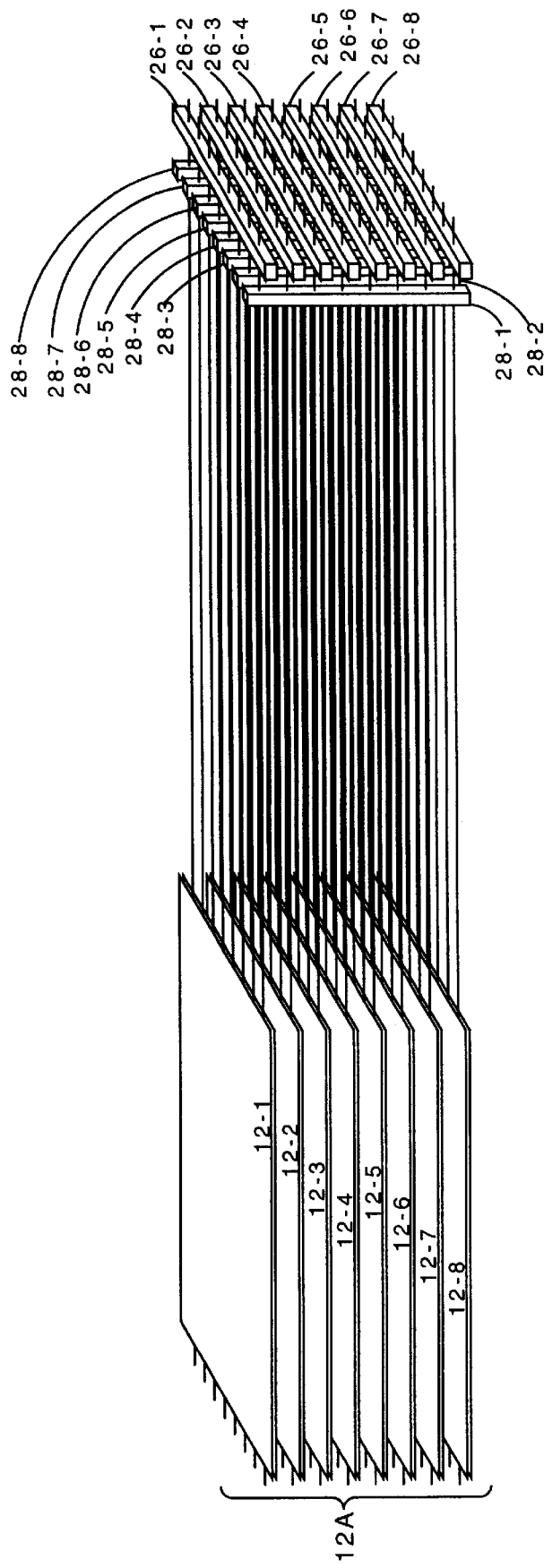
FIG. 5 is a perspective view showing the stacked group of first ribbons with a second group of fiber clamps installed.

As seen in FIG. 5 a second set of clamps 28-1 through 28-8 is added to secure the column positions of the fibers 22. Clamp 28-1 secures a first fiber from each ribbon 12-1 through 12-8 to form a first column group; clamp 28-2 secures a second fiber from each ribbon 12-1 through 12-8 to form a second column group; and successive clamps 28-n secure successive fibers from each ribbon 12-1 through 12-8 to form successive column groups.

Figure 6:
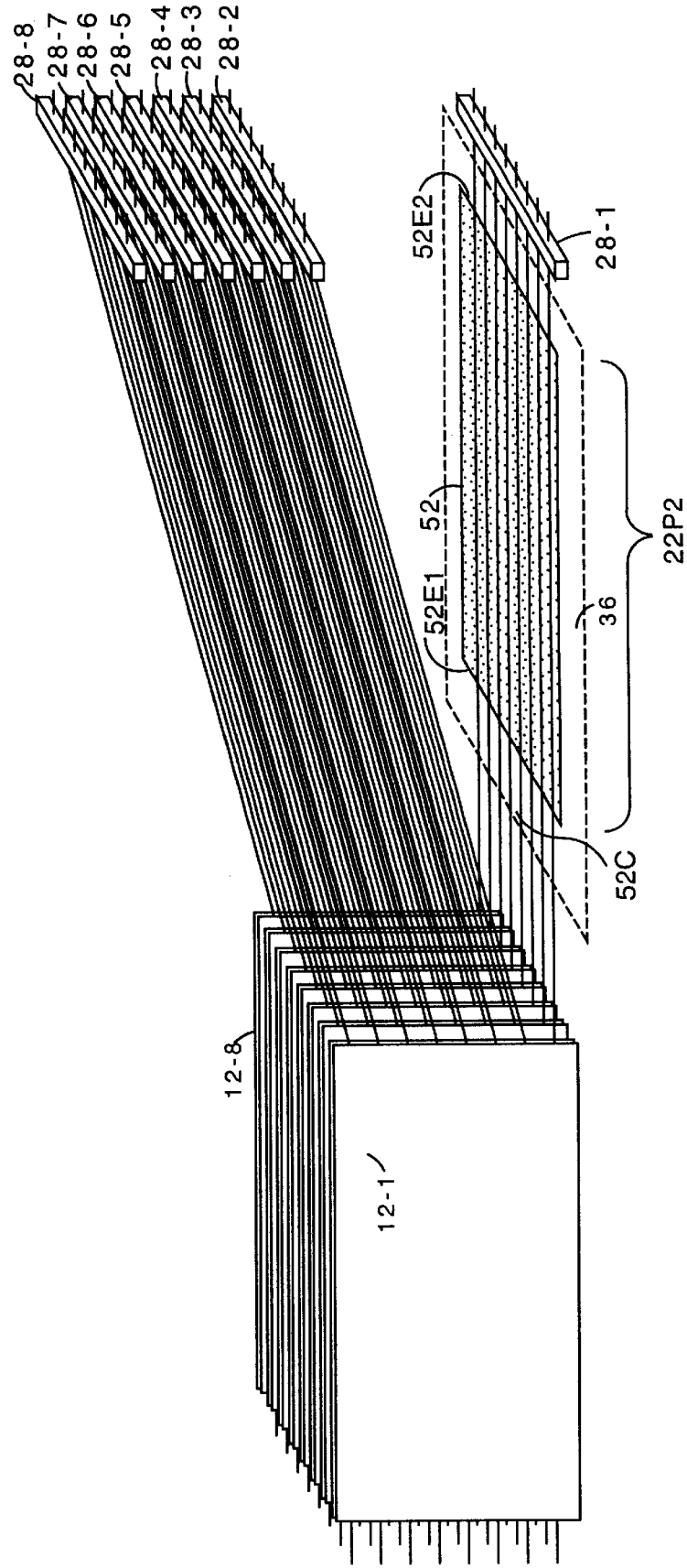
FIG. 6 is a perspective view of a first step for assembling a first ribbon of a second group.

As seen in FIG. 6 the array 12A of fibers has been rotated by ninety degrees from the position shown in FIG. 5 and the first set of clamps 26-1 through 26-8 have been removed. In FIG. 6 a third adhesive-coated tape 52 is secured to the assembly surface 36. The tape 52 has a first end 52E1 and a second end 52E2 and a centerline 52C.

The clamp 28-1 is then positioned so that a suitable length of fiber 22 of the first column group extends beyond the second end 52E2 of the third tape 52. A second portion 22P2 of each fiber 22 lying above the tape 52 is pressed down, adhering the fibers to the tape 52 in a side by side arrangement. A fourth tape 62 is then applied atop the first column group of fibers 22 and tape 52, sandwiching the portion 22P2 of the fibers 22 between tapes 52 and 62 to form a first column-group ribbon 14-1.

Figure 7:
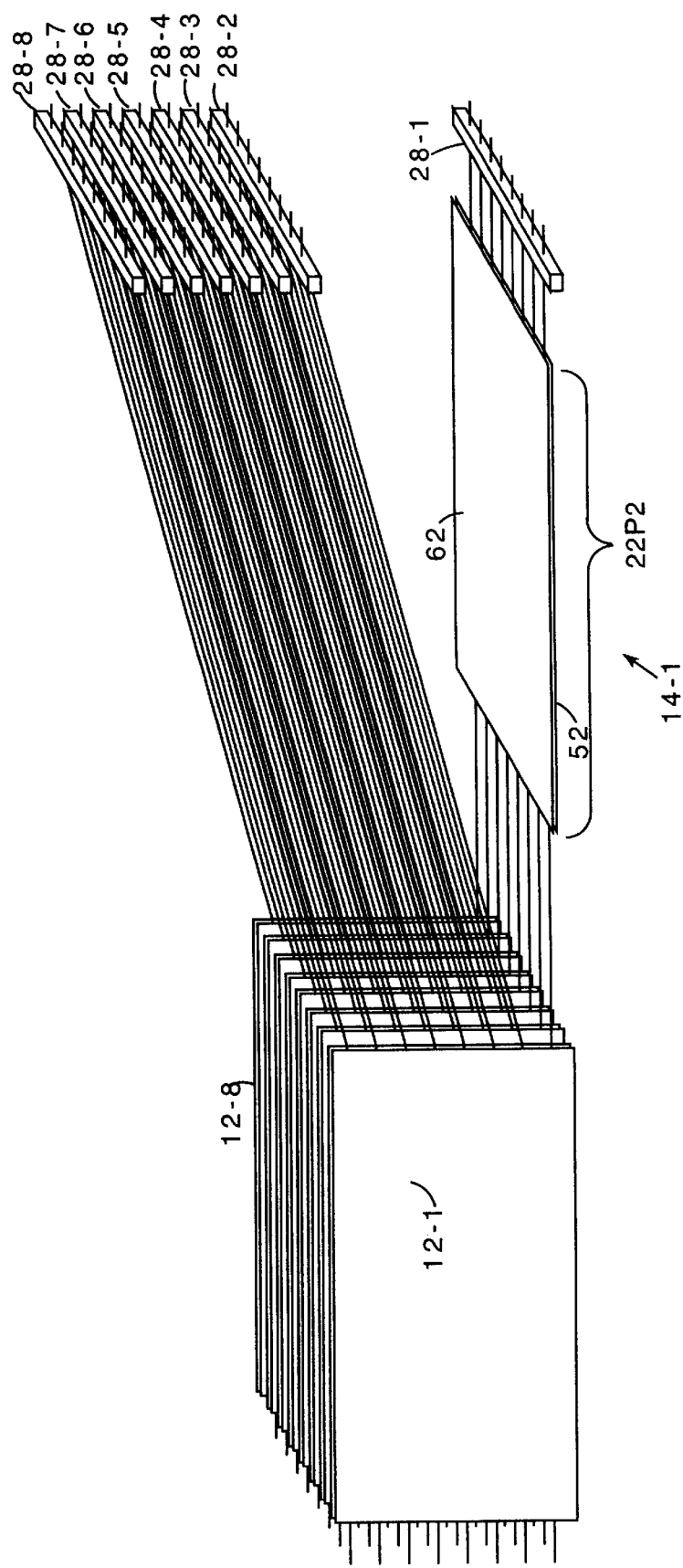
FIG. 7 is a perspective view of a second step for assembling the first ribbon of the second group.

The steps of FIG. 6–8 are then repeated until eight ribbons 14-1 through 14-8 have been formed. As seen in FIG. 9 the eight ribbons are stacked and secured together to form an output array 14A of fibers. From this figure it may be appreciated that the first fiber portions 22P1 of the ribbons of the input array 12A and the second fiber portions 22P2 of the ribbons of the output array 14A are spaced apart to define an intermediate fiber portion 22P3. This intermediate fiber portion 22P3 may be encapsulated in a suitable encapsulant 10E (shown as a transparent material for clarity of illustration) or may be covered with a sleeve 10S, as will be described in conjunction with FIG. 11.

As seen in FIG. 10, an optional step of twisting the second output group of ribbons 14 into alignment with the first input group of ribbons 12 may be performed so that the input and output ribbons lie in parallel planes.

Figure 10A:
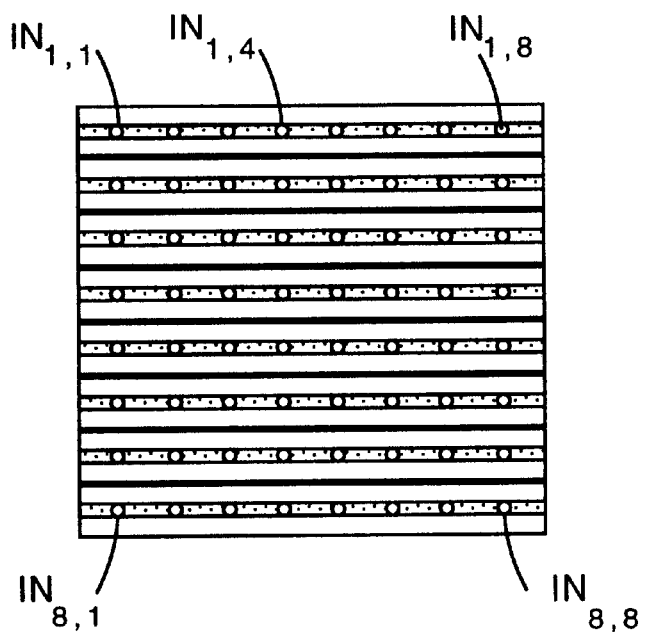
FIG. 10A is a sectional view identifying the array positions of the fibers of the input array.
Figure 10B:
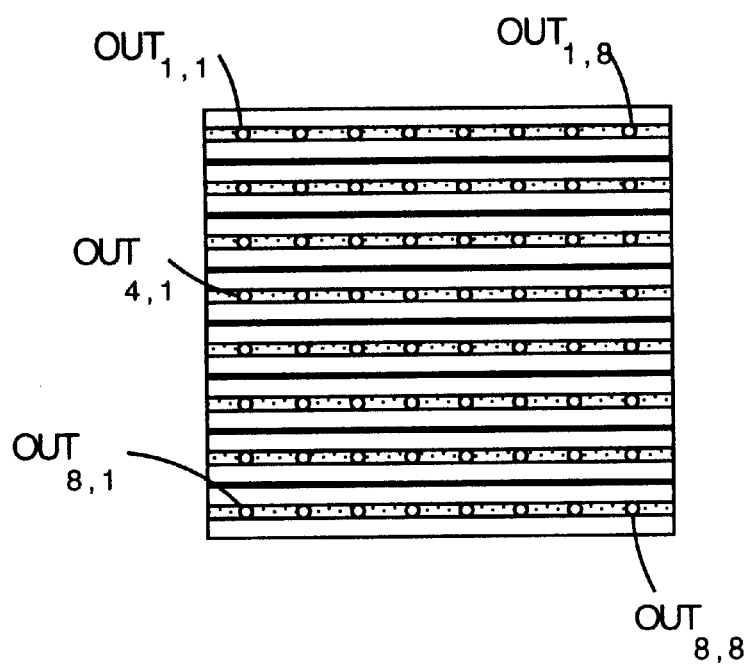
FIG. 10B is a sectional view identifying the array positions of the fibers of the output array.

The sectional view FIG. 10A shows the row and column identification of the fibers of the input array 12A. The input ends of the fibers are identified with the symbol "IN" and the subscripts "i" and "j" indicate the respective row and column identification of the fibers. For example fiber $IN_{1,1}$ indicates the fiber in row position 1 and column position 1, fiber $IN_{1,4}$ indicates the fiber in row position 1 and column position 4 and fiber $IN_{8,8}$ indicates the fiber in row position 8 and column position 8. The sectional view FIG. 10B shows the row and column identification of the fibers of the output array 14A. The input ends of the fibers are identified with the symbol "OUT" and the subscripts "i" and "j" indicate the respective row and column identification of the fibers. For example, fiber $OUT_{1,1}$ indicates the fiber in row position 1 and column position 1, fiber $OUT_{4,1}$ indicates the fiber in row position 4 and column position 1 and fiber $OUT_{8,8}$ indicates the fiber in row position 8 and column position 8.

It may be appreciated from FIGS. 10, 10A and 10B that the fiber identified as $IN_{1,1}$ in the input array is identified as $OUT_{1,1}$ in the output array, the fiber identified as $IN_{1,4}$ in the input array is identified as $OUT_{4,1}$ in the output array, and the fiber identified as $IN_{1,8}$ in the input array is identified as $OUT_{8,1}$ in the output array, thus establishing that a fiber at a position ij of the input array is routed to a corresponding fiber at an output position ji of the output array.

An assembled device 1 having a support sleeve 10S positioned over at least part of the first input group of ribbons 12 and at least part of the second output group of ribbons 14 may be seen in FIG. 11.

In a second assembly method, seen in FIG. 12, the ribbons 12 or 14 are formed by positioning the fibers 22 in a side-by-side arrangement and coating them with a liquid adhesive 72 that is then cured to form the ribbons. The adhesive may be applied by any suitable coating method. As shown, a group of fibers 22 is positioned on an assembly surface 36 having suitable non-stick properties and then the adhesive is hand-applied with a dispensing tool 74. The adhesive-coated fibers are then illuminated with a radiant energy source 76 to cure the adhesive 72. A fast-curing adhesive, such as an ultraviolet (UV) cureable adhesive, available from DSM Desotech of Elgin, Ill., may be used and cured with an ultraviolet source 76. Alternately, a thermosetting adhesive may be used in conjunction with an infrared heat source 76.

In the first and second methods, the M by N array 12A is created by forming the ribbons 12-1 through 12-M in a sequential manner. In contrast, in a first step of a third assembly method, seen in FIG. 13, the M by N array 12A is created by forming the ribbons 12-1 through 12-M simultaneously. In a preferred alternative of the third method the ribbons 12-1 through 12-M are formed as a single wide ribbon 12W, which is then slit into the individual ribbons 12-1 through 12-M. The individual ribbons 12-1 through 12-M are then stacked to form the input array 12A. Alternately, the ribbons 12-1 through 12-M may be separately formed in a side by side arrangement and then stacked to form the input array 12A. In the third assembly method the ribbons may be formed by joining the fibers in a side by side arrangement either using a tape-joining method similar to the first assembly method or by an adhesive-joining method similar to the second assembly method.

For clarity of illustration FIGS. 13 and 14 show a 4 by 4 array 12A, although any size array 12A may be assembled employing the present invention. In FIG. 13 a series of sixteen spools 20 of glass optical fiber 22 are provided. The fibers are passed through a guide 124 which has a 4 by 4 row and column matrix of openings corresponding to the row and column positions of the array 12A. A clip guide 126 is employed to capture a first row group of fibers 22R-1 adjacent to guide 124 and to guide these fibers into a slot 128S1 in guide roll 128. A pinch device, such as a pinch roll or pinch shoe, 130R1 is lowered into position to hold the row group of fibers in slot 128S1. The clip guide 126 is then released from the first row group of fibers 22R-1.

The clip guide 126 is then employed to capture a second row group of fibers 22R-2 and to guide these fibers into a slot 128S2 in guide roll 128. A pinch device 130R2 is lowered into position to hold the second row group of fibers in slot 128S2. In a similar manner each row group of fibers up through group 22R-M is positioned in corresponding slots 128M and held in place by pinch device 130M. The side-by-side positioned row groups of fibers 22R-1 through 22R-M are then advanced through the adhesive coating assembly 140 and the curing assembly 144 and thus form the wide ribbon 12W. The coating assembly 140 may be a roll-coater as shown or any other suitable coater. The curing assembly 144 comprises a housing 144H and an ultraviolet lamp 144L (similar to the light source 76 of FIG. 12) or other source of actinic radiation. The wide ribbon 12W is advanced through the slitting assembly 150, where slitting blades 150B slit the wide ribbon 12W into individual ribbons 12-1 through 12-M, which are then stacked to form fiber array 12A.

After a desired length of fiber array 12A is formed, advance of the fibers 22 and the resulting ribbons 12 is stopped, slitting blades 150B are retracted, adhesive coating assembly 140 is opened, the ultraviolet lamp 144L is turned off, the curing assembly 144 is opened, and the pinch rolls 130 are retracted, releasing the fibers from the slots 128.

As may be seen in FIG. 14, an N by M array 14A is created by forming the ribbons 14-1 through 14-N in a manner similar to the formation of ribbons 12-1 through 12-M. The clip guide 126 is employed to capture a first column group of fibers 22C-1 adjacent to guide 124 and to guide this group of fibers into the slot 128S1 in the guide roll 128. A pinch device 130R1 is lowered into position to hold the column group of fibers 22C-1 in slot 128S1. The clip guide 126 is then released from the first column group of fibers 22C-1. The clip guide 126 is then employed to capture a second column group of fibers 22C-2 and to insert this group of fibers into a slot 128S2 in guide roll 128. The pinch device 130R2 is lowered into position to hold the second column group of fibers 22C-2 in slot 128S2. In a similar manner each column group of fibers up through group 22C-N is positioned in corresponding slots up through 128N and held in place by pinch device 130N. The side-by-side positioned column groups of fibers 22C-1 through 22C-N are passed through the adhesive coating assembly 140, the curing assembly 144 and thus form a wide ribbon 14W. The wide ribbon 14W passes through the slitting assembly 150, where slitting blades 150B slit the wide ribbon 14W into individual ribbons 14-1 through 14-N, which are then stacked to form the fiber array 14A.

After a desired length of fiber array 14A is formed, advance of the fibers is stopped, slitting blades 150B retracted, adhesive coating assembly 140 and the curing assembly 144 are opened, and the pinch rolls 130 are retracted, releasing the fibers from the slots 128.

In a production environment, the step of forming array 12A and the step of forming array 14A may be then repeated sequentially to form as many optical interconnection devices as may be desired.

In assembling the devices of the present invention it is important to assure that the individual fibers 22 are positioned accurately within the arrays 12A and 14A. A quality control method, depicted schematically in FIG. 15, is employed which utilizes optical sources and optical detectors. An end of each fiber 22 at the core of each fiber spool 20 is coupled to an optical source 90 using a conventional ferrule coupler. The optical source 90 is typically mounted on an end face of the spool 20 and utilizes a conventional slip-ring device 92 to connect it to an electrical energy source 94. The optical sources 90 are selectively energized to illuminate each fiber 22 in a sequential manner. An optical detector arrangement 96 is used to detect which fiber 22 within the array is transmitting optical energy.

In contrast to prior art quality control methods which require access to both ends of a fiber within an interconnect device, and thus require cutting the interconnect devices apart, the present quality control method eliminates the need to cut the devices apart. The present quality control method is particularly useful in conjunction with the third assembly method. Each ribbon 12 or 14 may be passed over a curved mandrel assembly 97M, causing the bend radius of each of the fibers 22 to be such that light in the fiber core evanescently couples from the fiber, i.e., the bend radius is less than the minimum loss-free bend radius for the fiber 22. Light that escapes the fiber 22 when so bent may be detected by any suitable optical detector 96D, such as a charge-coupled-device (CCD) camera. A line-scan camera 96C having a suitable lens 96L has been found suitable to image the bent portion of the individual fibers 22 of a ribbon 12 or 14 onto the one or more rows of photodetectors 96P within the camera. The camera output signal 96S may then be transmitted to a suitable controller 200, which is typically implemented as a general purpose personal computer. The controller (computer) may be used to selectively energize the optical sources 90 and verify the row and column address ij of the detected optical signal 96S from the illuminated fiber with the address ij of the energized optical source 90.

FIG. 15 illustrates a typical analog signal 96S from the camera 96C. The analog signal may be transmitted to the controller 200 through a conventional interface module which converts the analog signal to a binary signal for subsequent analysis and array address detection. A camera having a built-in comparator circuit that converts the analog signal to a digital representation may also be used. Any suitable commercially available camera such as those available from Dalsa, Inc. or EG&G Reticon may be used.

In operation the controller 200 causes the mandrel assembly 97 to move to an asserted position 97P, causing the fibers 22 of the ribbon 12 or 14 to bend around the mandrel 97M. Controller 200 then energizes one of the optical sources 90, causing optical energy to be transmitted through the core of the corresponding fiber 22. The camera 96C images the bent portions of the fibers 22 on the mandrel 97M through lens 96L onto the photodetectors 96P, causing a signal 96S to be transmitted to the controller 200. The signal 96S is analyzed and the array address of the fiber 22 that is emitting light is calculated and compared to the address of the energized optical source.

For those skilled in the art further modifications should come to mind with the benefit of this invention. It is to be understood that a wide variety of modifications can be made to the present invention without departing from the spirit and the scope thereof. Such variations are claimed as the property and privilege of the invention herein.

We claim:

1. A method for the preparation of a device for connecting a first M by N array of optical fibers with a second N by M array of optical fibers, each first array comprising M rows and N columns of fibers and each second array comprising N rows and M columns of fibers, wherein each row is identified by a first subscript i and each column is identified by a second subscript j, wherein a fiber at a position ij of an input array is routed to a corresponding position ji of an output array, the method comprising:

(a) assembling a first input array of optical fibers, comprising M optical fiber ribbons, by assembling M row-groups of fibers, each row-group comprising N fibers, into M ribbons by:

(i) selecting a first portion of each optical fiber from each row-group of the first array, the first fiber portions being adjacent to a first end of the fiber;

(ii) assembling a row-group of fibers by adhering the first portions of each selected optical fiber in a side-by-side arrangement to form a row-group optical fiber ribbon;

(iii) repeating steps (i) - (ii) until M row-group ribbons are assembled;

(iv) stacking the M row-group ribbons atop one another to form a first input array of fibers;

(b) assembling a second output array of optical fibers, comprising N optical fiber ribbons, by assembling N column-groups of fibers, each column-group comprising M fibers, into N ribbons by:

(i) selecting a second portion of each optical fiber from each column-group of the first array, the second fiber portion being adjacent to a second end of the fiber;

(ii) assembling a column-group of fibers by adhering the second portions of each selected optical fiber in a side-by-side arrangement to form a column-group optical fiber ribbon;

(iii) repeating steps (i) - (ii) until N column-group ribbons are assembled;

(iv) stacking the N column-group ribbons atop one another to form a second output array of fibers; so that a fiber at a row position ij of the input array is routed to a corresponding column position ji of the output array.

2. The method of claim 1, wherein M and N are equal.

3. The method of claim 1, wherein the adhering of the first portions of each selected optical fiber in a side-by-side arrangement in steps (a) (ii) and (b) (ii) is performed using an photo-curable adhesive.

4. The method of claim 3, wherein the photo-curable adhesive is an ultraviolet-curable adhesive.

5. The method of claim 1 wherein the adhering of the first portions of each selected optical fiber in a side-by-side arrangement in steps (a) (ii) and (b) (ii) is performed using a thermosetting adhesive.

6. The method of claim 1, wherein the assembling step (a) comprises:

(i) assembling a row-group of fibers by laying down a plurality of N optical fibers onto a first adhesive-coated carrier tape, each fiber having a first end corresponding to the input array and a second end corresponding to the output array, the tape having a predetermined width and first and second ends and a center line, wherein a first portion of each fiber is received on the adhesive-coated surface parallel to the center line, the first fiber portion being chosen so that the first end of each fiber extends substantially beyond the first end of the carrier tape and the second end of each fiber extends substantially beyond the second end of the carrier tape;

(ii) positioning a second adhesive-coated carrier tape atop the first tape so that the first fiber portions are sandwiched between the first and second tapes to form a first optical fiber ribbon;

(iii) repeating steps (i) and (ii) until M row-group ribbons are assembled;

(iv) stacking the M row-group ribbons atop one another to form the first input array of fibers.

7. The method of claim 1 wherein the assembling step (b) comprises:

(i) selecting a second portion of a first optical fiber from each row-group of the first array, the second fiber portion being adjacent to the second end of the first and second tapes;

(ii) assembling a column-group of fibers by laying down the second portion of each selected optical fiber onto a third adhesive-coated carrier tape, the tape having first and second ends and a center line, wherein each fiber is received on the adhesive-coated surface parallel to the center line and wherein the second end of each fiber extends substantially beyond the second end of the third carrier tape;

(iii) positioning a fourth adhesive-coated carrier tape atop the third tape so that the fibers are sandwiched between the third and fourth tapes to form a column-group optical fiber ribbon;

(iv) repeating steps (i) –(iii), by selecting the next optical fiber from each row-group, until N ribbons are assembled;

(v) stacking the N ribbons atop one another to form the second output array of fibers.

8. The method of claim 1, further comprising positioning a support sleeve over at least part of the first ribbons and at least part of the second ribbons.

9. The method of claim 1, wherein the first fiber portion and the second fiber portion are spaced apart to define an intermediate fiber portion.

10. The method of claim 9, further comprising positioning a support sleeve over the intermediate fiber portion.

11. The method of claim 9, wherein the second output array of fibers is rotated so that the ribbons of the second output array of fibers are substantially coplanar with the ribbons of the first input array of fibers.

12. The method of claim 11 further comprising positioning a support sleeve over the intermediate fiber portion.

13. A method for the preparation of a device for connecting a first M by N array of optical fibers with a second N by M array of optical fibers, each first array comprising M rows and N columns of fibers and each second array comprising N rows and M columns of fibers, wherein each row is identified by a first subscript i and each column is identified by a second subscript j, wherein a fiber at a position ij of an input array is routed to a corresponding position ji of an output array, the method comprising:

(a) assembling a first input array of optical fibers, comprising M optical fiber ribbons, by assembling a first wide ribbon comprising M row-groups of fibers in a side-by-side arrangement, each row-group comprising N fibers;

(b) slitting the first wide ribbon into M ribbons;

(c) stacking the M ribbons atop one another to form the input array of fibers;

(d) assembling a second output array of optical fibers, comprising N optical fiber ribbons, by assembling a second wide ribbon comprising N column-groups of fibers in a side-by-side arrangement, each column-group comprising M fibers;

(e) slitting the second wide ribbon into N ribbons;

(f) stacking the N ribbons atop one another to form the output array of fibers.

14. The method of claim 13 wherein the assembling step (a) comprises:

(i) passing a plurality of fibers through a guide having a M by N row and column matrix of openings;

(ii) capturing row groups of fibers in a clip guide and positioning each row group of fibers in a slot in a guide roll;

(iii) placing a pinch device over the fibers to retain them in the slots of the guide roll;

(iv) adhering the fibers in a side-by-side arrangement to form the first wide ribbon.

15. The method of claim 14 wherein the adhering of the first portions of each selected optical fiber in a side-by-side arrangement in step (iv) is performed using a photo-curable adhesive.

16. The method of claim 14 wherein the adhering of the first portions of each selected optical fiber in a side-by-side arrangement in step (iv) is performed using a pair of adhesive-coated carrier tapes.

17. The method of claim 13 wherein the assembling step (d) comprises:

(i) passing a plurality of fibers through a guide having a M row by N column matrix of openings;

(ii) capturing column groups of fibers in a clip guide and positioning each column group of fibers in a slot in a guide roll;

(iii) placing a pinch device over the fibers to retain them in the slots of the guide roll;

(iv) adhering the fibers in a side-by-side arrangement to form the second wide ribbon.

18. The method of claim 16 wherein the adhering of the first portions of each selected optical fiber in a side-by-side arrangement in step (iv) is performed using an photo-curable adhesive.

19. The method of claim 16 wherein the adhering of the first portions of each selected optical fiber in a side-by-side arrangement in step (iv) is performed using a pair of adhesive-coated carrier tapes.

20. A method for verifying the location of each fiber in a device for connecting a first M by N array of optical fibers with a second N by M array of optical fibers, each first array comprising M rows and N columns of fibers and each second array comprising N rows and M columns of fibers, the device comprising an input array of optical fibers, comprising M rows of optical fiber ribbons and an output array of optical fibers, comprising N columns of optical fiber ribbons, wherein each row is identified by a first subscript i and each column is identified by a second subscript j, wherein a fiber at a position ij of an input array is routed to a corresponding position ji of an output array, the method comprising:

(a) connecting an optical source to a first end of each optical fiber;

(b) bending a portion of each ribbon over a curved mandrel so that the fibers are bent to a radius sufficiently small to cause coupling of light out of the fiber;

(c) positioning a photodetector adjacent the bent portion of the each of the fibers;

(d) sequentially illuminating each fiber by selectively energizing the light sources;

(e) detecting light emitted from the bent portion of the illuminated fiber;

(f) verifying the row and column position within the array of the illuminated fiber.

21. A fiber interconnect apparatus, made by the method of claim 1, for connecting a first M by N array of optical fibers with a second N by M array of optical fibers, each first array comprising M rows and N columns of fibers and each second array comprising N rows and M columns of fibers, the device comprising an M by N input array, comprising M row-group ribbons, and an N by M output array, comprising N column-group ribbons, wherein each row is identified by a first subscript i and each column is identified by a second subscript j, wherein a fiber at a position ij of an input array is routed to a corresponding position ji of an output array.

* * * * *